(12) United States Patent
Schuenemann et al.

(10) Patent No.: US 12,036,860 B2
(45) Date of Patent: Jul. 16, 2024

(54) CHARGING FLAP ARRANGEMENT FOR A MOTOR VEHICLE

(71) Applicant: Dr. Ing. h.c. F. Porsche Aktiengesellschaft, Stuttgart (DE)

(72) Inventors: Alexander Schuenemann, Fellbach (DE); Nils Kreiling, Osnabrueck (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 262 days.

(21) Appl. No.: 17/690,061

(22) Filed: Mar. 9, 2022

(65) Prior Publication Data

US 2022/0289021 A1 Sep. 15, 2022

(30) Foreign Application Priority Data

Mar. 10, 2021 (DE) ...................... 10 2021 105 801.5

(51) Int. Cl.
*B60K 15/05* (2006.01)
(52) U.S. Cl.
CPC ...... *B60K 15/05* (2013.01); *B60K 2015/0515* (2013.01); *B60K 2015/0553* (2013.01)
(58) Field of Classification Search
CPC ............ B60K 15/05; B60K 2015/0515; B60K 2015/0553
USPC ...................................................... 296/97.22
See application file for complete search history.

(56) References Cited

U.S. PATENT DOCUMENTS

| 2015/0008685 | A1 | 1/2015 | Beck |
| 2019/0368240 | A1 | 12/2019 | Stack et al. |
| 2020/0346541 | A1* | 11/2020 | Glickman .............. B60K 15/05 |
| 2021/0095501 | A1 | 4/2021 | Eberle |

FOREIGN PATENT DOCUMENTS

| DE | 102012023873 A1 * | 6/2014 | .......... B60L 11/1818 |
| DE | 102012023873 A1 | 6/2014 | |
| DE | 102013222509 A1 * | 5/2015 | .......... B60L 11/1818 |
| DE | 102015220484 A1 | 4/2017 | |
| DE | 102017129049 A1 | 6/2019 | |
| DE | 102019126481 B3 * | 2/2021 | ............. B60K 15/05 |
| JP | S 5887622 U | 6/1983 | |
| JP | 2020070564 A | 5/2020 | |
| WO | WO 2014/045769 A1 | 3/2014 | |
| WO | WO 2020249374 A1 | 12/2020 | |

OTHER PUBLICATIONS

DE-102013222509-A1 (Schwarz T) (May 21, 2015) (Year: 2015).*

* cited by examiner

*Primary Examiner* — Mahmoud Gimie
(74) *Attorney, Agent, or Firm* — LEYDIG, VOIT & MAYER, LTD.

(57) ABSTRACT

A charging flap arrangement (3) has a charging flap housing (6) which configures a recess (7) for arranging a charging plug coupling (8). The recess (7) configures the charging plug opening (5) opposite the charging plug coupling (8). The charging flap arrangement includes a charging flap (9) for closing the charging plug opening (5), an electric locking device (10) for locking the charging flap (9) which has been adjusted into a closed position, and an emergency unlocking mechanism (13) which makes opening of the charging flap (9) possible if the electric locking device (10) fails in the case of a locked charging flap (9).

11 Claims, 5 Drawing Sheets

CHARGING FLAP ARRANGEMENT FOR A MOTOR VEHICLE

CROSS REFERENCE TO RELATED APPLICATIONS

This application claims benefit to German Patent Application No. DE 10 2021 105 801.5, filed on Mar. 10, 2021, which is hereby incorporated by reference herein.

FIELD

The present invention relates to a charging flap arrangement for closing a charging plug opening which is provided in a vehicle body part of a motor vehicle. Moreover, the invention relates to a motor vehicle which is equipped with at least one charging flap arrangement of this type.

BACKGROUND

Battery electric vehicles, such as electromotive hybrid vehicles or electric vehicles, have a battery, what is known as a traction battery, which provides the electrical power for the electric drive of the vehicle. At least one charging interface is provided on the vehicle in order to charge this battery, via which charging interface an external electrical energy supply, for example in the form of a charging station, can be coupled electrically to the battery. To this end, a charging plug coupling is used on the vehicle side, into which charging plug coupling a charging plug which is complementary with respect to it can be plugged, in order to establish the electrical coupling between the external energy supply and the battery. A charging flap arrangement is used in order to protect a charging plug coupling of this type against contamination and unauthorized access.

A charging flap arrangement of the generic type is known, for example, from DE 10 2012 023 873 A1. A charging flap arrangement of this type serves to close a charging plug opening which is provided in a vehicle body part of the vehicle. The charging flap arrangement has a charging flap housing which configures a recess for arranging a charging plug coupling. The recess for its part configures the charging plug opening opposite the charging plug coupling, through which charging plug opening a charging plug which is complementary with respect to the charging plug coupling can be plugged. Moreover, the charging flap arrangement has an adjustable charging flap for closing the charging plug opening. Furthermore, the charging flap arrangement has an electric locking device for locking the charging flap which has been adjusted into a closed position in order to close the charging plug opening. The locking device operates with an electrically actuable actuator which can be adjusted between a locked state, in which the actuator blocks the charging flap in its closed position, and an unlocked state, in which the actuator releases the charging flap for opening and closing the charging plug opening. Furthermore, the charging flap arrangement is equipped with an emergency unlocking mechanism which makes opening of the charging flap possible even when the electric locking device fails in the case of an actuator which has been adjusted into the locked state. It is therefore possible, even in the case of failure of the electric locking device, for the charging flap to be opened via the emergency unlocking mechanism, in order for it to be possible for a charging plug to be plug-connected to the charging plug coupling and for the battery to be charged.

In the case of the charging flap arrangement which is known from DE 10 2012 023 873 A1 which is cited in the preceding text, the emergency unlocking mechanism is realized by the fact that, in addition to the electric actuation of the actuator, a mechanical actuation of the actuator is provided, for example in the form of a lock which can be actuated with the aid of a key and is coupled mechanically to the actuator via a cable pull. The provision of an additional mechanical actuation of this type for the actuator entails comparatively high complexity which, moreover, requires additional installation space.

DE 10 2017 129 049 A1 has disclosed another charging flap arrangement, in the case of which the charging flap has a flap carrier, which is mounted pivotably on the charging flap housing, and a flap cover which is fastened releasably to the flap carrier. In the case of this charging flap arrangement, an emergency unlocking mechanism is provided by virtue of the fact that, in the case of a closed charging flap, the flap cover can be removed from the flap carrier with the aid of a special tool, as a result of which the flap carrier releases a carrier opening which is of sufficiently large dimensions for it to be possible for a charging plug which is complementary with respect to the charging plug coupling to be coupled properly to the charging plug coupling through this carrier opening. In order that an emergency unlocking mechanism of this type can be realized, the charging flap has to be of comparatively large dimensions, in order that a carrier opening which is sufficiently large for proper plugging of the charging plug can be provided in the case of a removed flap cover and in the case of a flap carrier which has been adjusted into the closed position. Furthermore, the requirement of a special tool for releasing the flap cover is associated with the difficulty that this special tool is actually available in an emergency.

SUMMARY

In an embodiment, the present disclosure provides a charging flap arrangement for closing a charging plug opening which is provided in a vehicle body part of a motor vehicle, the charging flap arrangement comprising: a charging flap housing which configures a recess for arranging a charging plug coupling, the recess configuring the charging plug opening opposite the charging plug coupling, through which charging plug opening a charging plug which is complementary to the charging plug coupling can be plugged to the charging plug coupling an adjustable charging flap for closing the charging plug opening, an electric locking device for locking the charging flap in a closed position thereof that closes the charging plug opening, and wherein the locking device has an electrically actuable actuator which can be adjusted between a locked state, in which the actuator blocks the charging flap in its closed position, and an unlocked state, in which the actuator releases the charging flap for opening and closing the charging plug opening, and an emergency unlocking mechanism which makes opening of the charging flap possible if the electric locking device fails in the case of the actuator having been adjusted into the locked state, wherein the charging flap has a flap carrier, which is mounted pivotably on the charging flap housing, and a flap cover, which is fastened releasably to the flap carrier, wherein the charging flap has a fitting element which has a locking contour and which is arranged on the flap carrier such that it can be adjusted between an active position and a passive position, wherein the actuator has a latch which can be adjusted between a locked position, which the latch assumes in the locked state of the actuator, and an unlocked position, which the latch assumes in the unlocked state of the actuator, wherein in its locked position, the latch is in engagement with the locking contour of the fitting element which has been adjusted into its active position, in order to lock the charging flap in its closed position, wherein in the passive position of the fitting element, the locking contour releases the latch which has been adjusted into its locked position, such that the charging flap can be opened, and wherein the fitting element is accessible for a manual adjustment of the fitting element between the active position and the passive position when the flap cover is removed.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
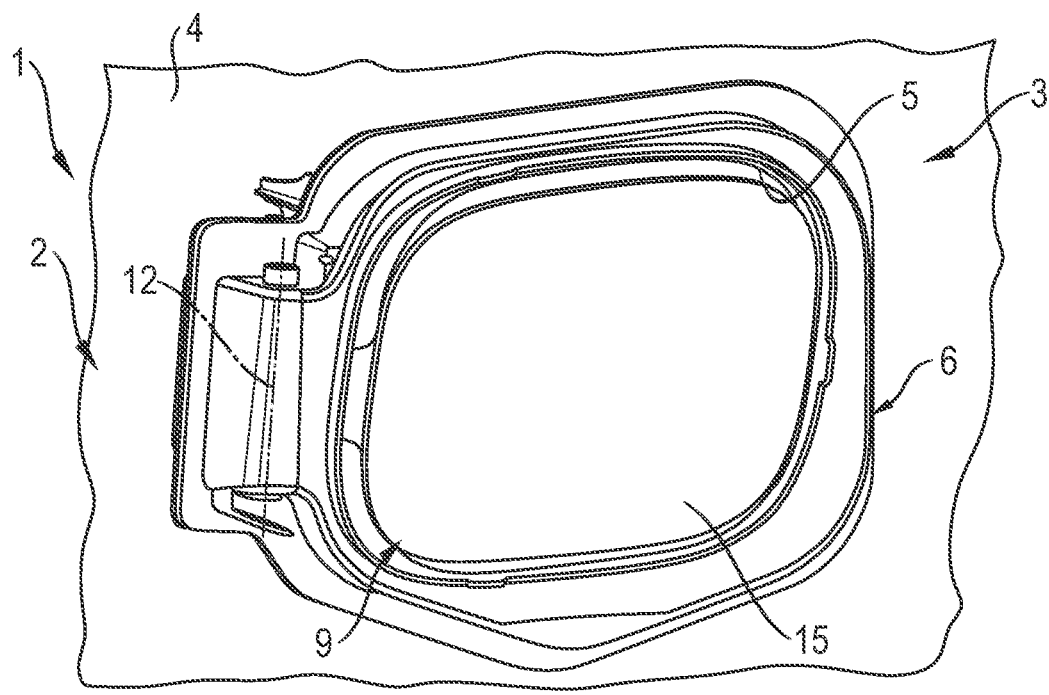
FIG. 1 shows an isometric top view of a charging flap arrangement with a charging flap in a closed position.

Embodiments of the present invention specify improvements over charging flap arrangements known in the art. Embodiments of the present invention are distinguished by the fact that they make inexpensive emergency unlocking possible in the case of a small installation space requirement.

Embodiments of the present invention are based on the general concept of equipping the charging flap with a fitting element which has a locking contour and which is arranged such that it can be adjusted between an active position and a passive position. Furthermore, the actuator is equipped with a latch which can be adjusted between a locked position, which the latch assumes in the locked state of the actuator, and an unlocked position, which the latch assumes in the unlocked state of the actuator. Furthermore, the actuator and the fitting element are adapted to one another in such a way that, in its locked position, the latch is in engagement with the locking contour of the fitting element which has been adjusted into its active position, in order to lock the charging flap in its closed position. Furthermore, it is provided that, in the passive position of the fitting element, the locking contour releases the latch which has been adjusted into its locked position, with the result that the charging flap can be opened. In order that the fitting element is inaccessible for the proper operation of the charging flap arrangement and/or the electric locking device, it is arranged on a flap inner side which faces the charging plug coupling. In order that, in the case of a failure of the electric locking device, the fitting element is accessible for actuating the emergency unlocking mechanism, the charging flap has a flap carrier, which is mounted pivotably on the charging flap housing, and a flap cover which is fastened releasably to the flap carrier on the outside. In the case of a removed flap cover, the fitting element is accessible for a manual adjustment of the fitting element between the active position and the passive position and vice versa. In other words, in the case of failure of the electric locking device, the flap cover can be removed from the flap carrier manually or by means of a standard tool or else by means of a special tool, as a result of which the fitting element is accessible for actuating the emergency unlocking mechanism. In the case of a removed flap cover, the user can transfer the fitting element manually into its passive position, as a result of which the charging flap and/or the flap carrier can be transferred into the open position of the charging flap. As a result, the charging plug opening is released, with the result that a charging plug can be coupled properly to the charging plug coupling. This emergency unlocking mechanism is fully reversible. After the charging operation and after the charging plug has been pulled off, the flap carrier can be adjusted into the closed position of the charging flap again. The fitting element can be adjusted manually into the active position again. Finally, the flap cover can be attached to the flap carrier again.

Furthermore, this emergency unlocking mechanism manages without an additional mechanical coupling to the actuator, with the result that an additional mechanical actuation of the actuator can be dispensed with. As a consequence, the charging flap arrangement which is proposed herein can be realized comparatively inexpensively. Since, moreover, the charging flap can be opened completely with the aid of the emergency unlocking mechanism, the charging flap arrangement which is proposed herein has a comparatively compact overall design and does not require any additional installation space.

The actuator is expediently attached or fastened to the charging flap housing.

In accordance with some advantageous embodiments, the latch can be arranged on the actuator such that it can be adjusted rotationally about a latch axis, and can perform a rotational movement by a locking angle between the locked position and the unlocked position. The fitting element can then be arranged on the flap carrier such that it can be adjusted rotationally about a fitting axis, and can perform a rotational movement by the locking angle between the active position and the passive position. The fitting axis expediently extends substantially parallel to the latch axis when the flap carrier is situated in the closed position. The locking angle preferably lies in a range from 75° to 105° and can be, in particular, approximately 90°.

In accordance with some advantageous embodiments, the fitting element can have an actuating arm which is eccentric with regard to the rotational axis and by way of which the fitting element can be adjusted manually between the active position and the passive position and back. The handling of the fitting element is simplified as a result.

In accordance with some embodiments, the charging flap can be mounted on the charging flap housing such that it can be pivoted about a charging flap axis between the closed position which closes the charging plug opening and an open position which releases the charging plug opening. The fitting element is then arranged in a flap region of the charging flap, which flap region is remote from the flap axis. As a result, during opening and closing of the charging flap, the fitting element moves along a circular arc path, the center point of which lies on the charging flap axis.

In accordance with some advantageous embodiments, the latch which has been adjusted into the locked position can be in positively locking engagement in an opening direction with the fitting element which has been adjusted into the active position, in which opening direction the fitting element has to be moved out of the closed position in order to open the charging flap. In other words, the positively locking engagement between the latch and the fitting element or its locking contour blocks an adjustment of the fitting element in the opening direction. If the fitting element is then adjusted into its passive position, the fitting element or its locking contour releases the positively locking engagement or deactivates the positively locking engagement between the latch and the fitting element. As a consequence, the fitting element can be adjusted out of the closed position in the opening direction relative to the latch in order to open the charging flap. As a result, particularly functionally reliable kinetics which can be realized simply are provided.

Some embodiments are particularly expedient, in which the opening direction runs perpendicularly with respect to the flap axis. Furthermore, some embodiments are advantageous, in which the opening direction runs parallel to the latch axis. In some embodiments, the opening direction runs perpendicularly with respect to the latch axis.

In accordance with some advantageous embodiments, the fitting element can have an annular body which has the locking contour and is inserted into a fitting opening which is configured on the flap carrier. The annular body can have the locking contour radially on the inner side, while it has an annular step radially on the outer side, which annular step is supported, on a flap inner side of the flap carrier which faces the actuator, on an opening edge which surrounds the fitting opening. An axial bearing is as it were produced between the annular step and the opening edge, which axial bearing simplifies the rotational adjustability between the fitting element and the flap carrier.

In accordance with some embodiments, on a flap outer side which faces away from the actuator, the flap carrier can have an annular retaining guide piece which surrounds the fitting opening, projects parallel to the fitting axis, and which has a varying axial height in the circumferential direction, with the result that the retaining guide piece has long sections and short sections which follow one another in the circumferential direction and merge into one another. This design simplifies the mounting of the fitting element on the flap carrier.

Some embodiments are particularly expedient in this context, in which the fitting element has at least two catches which retain the fitting element on the retaining guide piece in the passive position. The catches then secure the fitting element on the long sections of the retaining guide piece. Moreover, during the mounting of the fitting element on the flap carrier, the catches can be helpful, in order to facilitate the mounting. For example, in the case of insertion of the fitting element into the fitting opening, the catches can first of all latch with the short sections of the retaining guide piece, in order to secure the fitting element. As a result, the catches are given an additional function.

The actuating arm can expediently retain the fitting element on the retaining guide piece in the active position. As a result, the actuating arm likewise has a dual function.

In some advantageous embodiments, a bayonet fastening is configured between the retaining guide piece and the fitting element, which bayonet fastening holds the fitting element on the retaining guide piece in the active position. This bayonet fastening is advantageously closed by way of adjustment of the fitting element into the active position, whereas it is opened by way of adjustment of the fitting element into the passive position. In the case of an open bayonet fastening, the fitting element can be secured on the retaining guide piece by way of the optionally present, abovementioned catches.

Some embodiments are distinguished by the fact that the flap carrier has a support frame, on which the flap cover is fixed releasably on the outside, that is to say on a side which faces away from the actuator, and a flap covering which is fastened to the support frame on the inside, that is to say on a side which faces the actuator, the fitting element being arranged in an adjustable manner on the flap covering. The flap covering can support a seal which, in the closed position, interacts with the flap housing and surrounds the charging plug opening. If present, the flap covering can have the fitting opening mentioned further above and the retaining guide piece. The flap carrier can be mounted on the flap housing such that it can be pivoted via the support frame or via the flap covering.

A vehicle according to an embodiment of the invention has a vehicle body and is equipped with at least one charging flap arrangement of the above-described type. The respective charging flap arrangement can expediently be integrated into the vehicle body of the vehicle in such a way that, in its closed position, the charging flap is lowered in the vehicle body and is arranged in a flush manner.

It goes without saying that the features which are mentioned in the preceding text and are still to be described in the following text can be used not only in the respective specified combination, but rather also in other combinations or on their own, without departing from the scope of the invention. Constituent parts, mentioned in the preceding text and still to be mentioned in the following text, of a superordinate unit, such as, for example, a device, an apparatus or an arrangement which are denoted separately, can form separate modules or components of this unit or can be integral regions or sections of this unit, even if this is shown otherwise in the drawings.

Preferred exemplary embodiments of the invention are shown in the drawings and will be described in greater detail in the following description, identical designations relating to identical or similar or functionally identical components.

In accordance with FIG. 1, a vehicle 1, such as a passenger car, comprises a vehicle body 2 and at least one charging flap arrangement 3 which is installed into a vehicle body part 4 of the vehicle body 2. The vehicle body part 4 can be, for example, a wing.

The charging flap arrangement 3 serves to close a charging plug opening 5 which is provided in the vehicle body part 4. In the case of a mounted charging flap arrangement 3, this charging plug opening 5 is defined by way of the charging flap arrangement 3.

Figure 2:
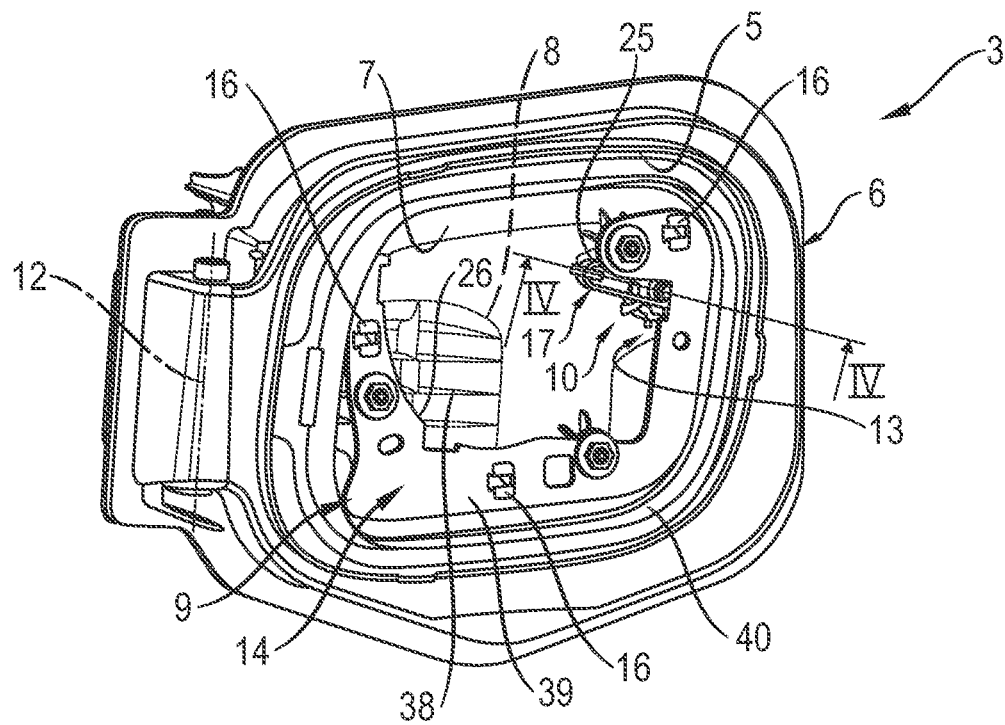
FIG. 2 shows a view as in FIG. 1, but with a removed flap cover and with a fitting element in an active position.
Figure 3:
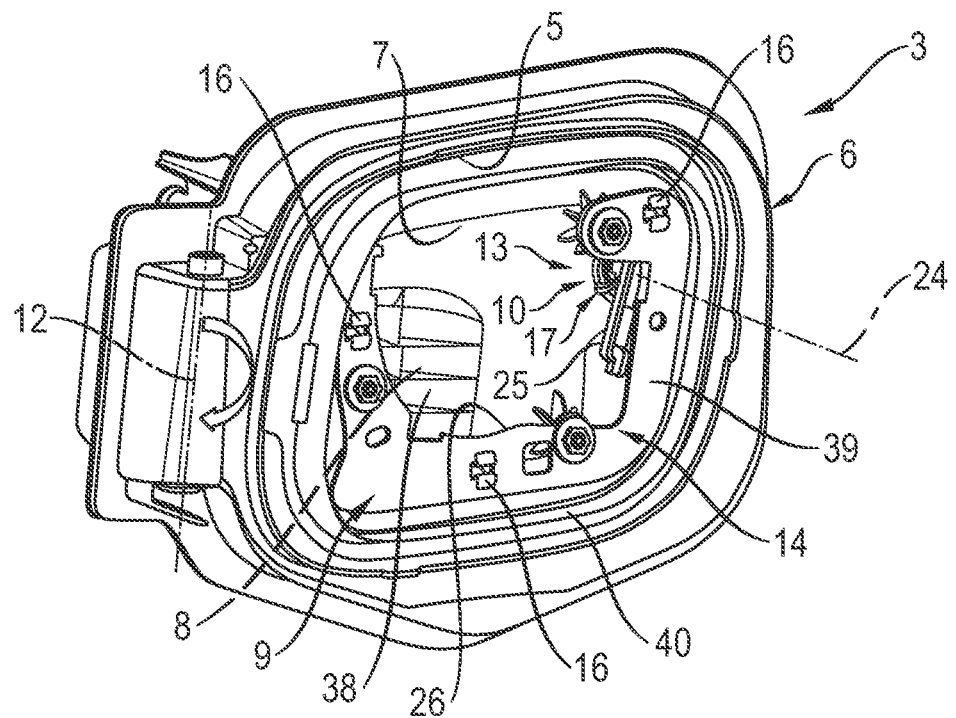
FIG. 3 shows a view as in FIG. 2, but with a fitting element which has been adjusted into a passive position.

According to FIGS. 1 to 3, the charging flap arrangement 3 has a charging flap housing 6 which configures a recess 7, in which a charging plug coupling 8 which is concealed in FIGS. 1 to 3 is arranged when the charging flap arrangement 3 is mounted properly on the vehicle 1. This charging plug coupling 8 is connected electrically via a corresponding charging electronics system to a battery of the vehicle 1. A charging plug (not shown) which is complementary with respect to the charging plug coupling 8 can be coupled to the charging plug coupling 8, in order to connect the vehicle 1 to an external electrical energy supply, for example to a charging station. Opposite the charging plug coupling 8, the recess 7 configures the charging plug opening 5, through which the charging plug can be plug-connected to the charging plug coupling 8. The charging plug coupling 8 can be a constituent part of the charging flap arrangement 3, but does not have to be.

Figure 4:
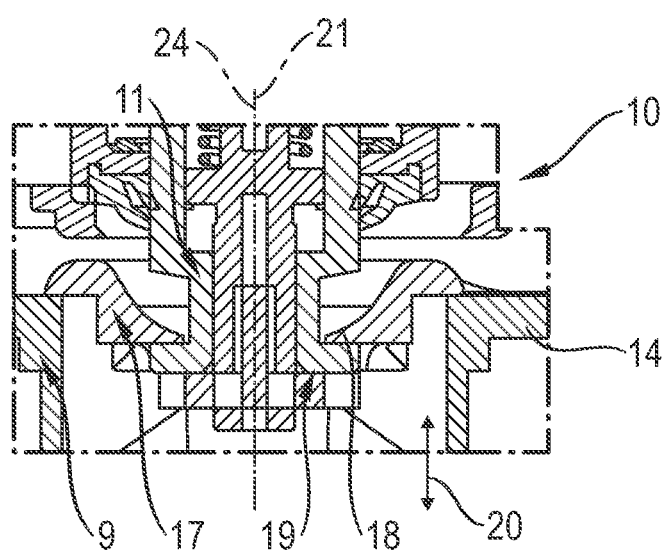
FIG. 4 shows a sectional view in accordance with sectional lines IV in FIG. 2 through an actuator in the locked state.
Figure 5:
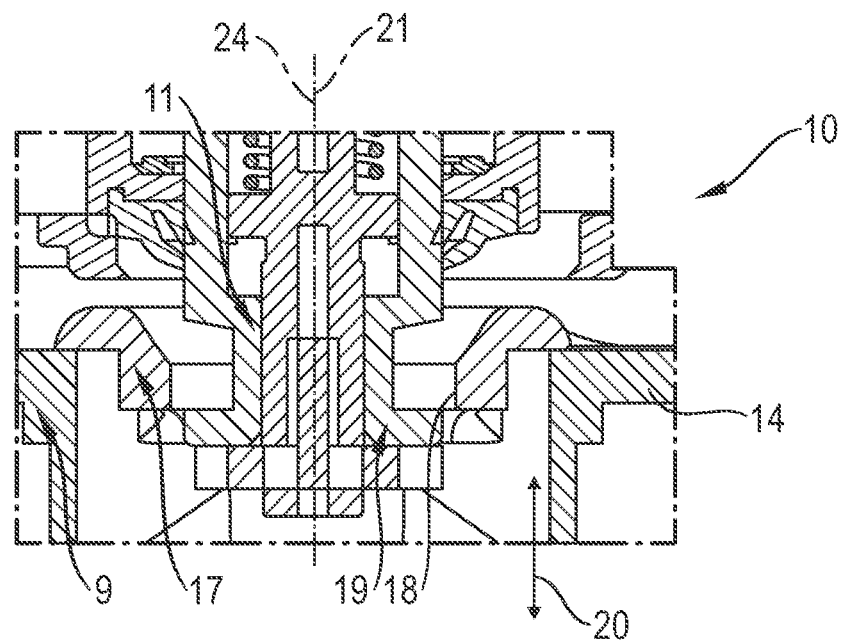
FIG. 5 shows a sectional view as in FIG. 4, but with the actuator in an unlocked state.
Figure 6:
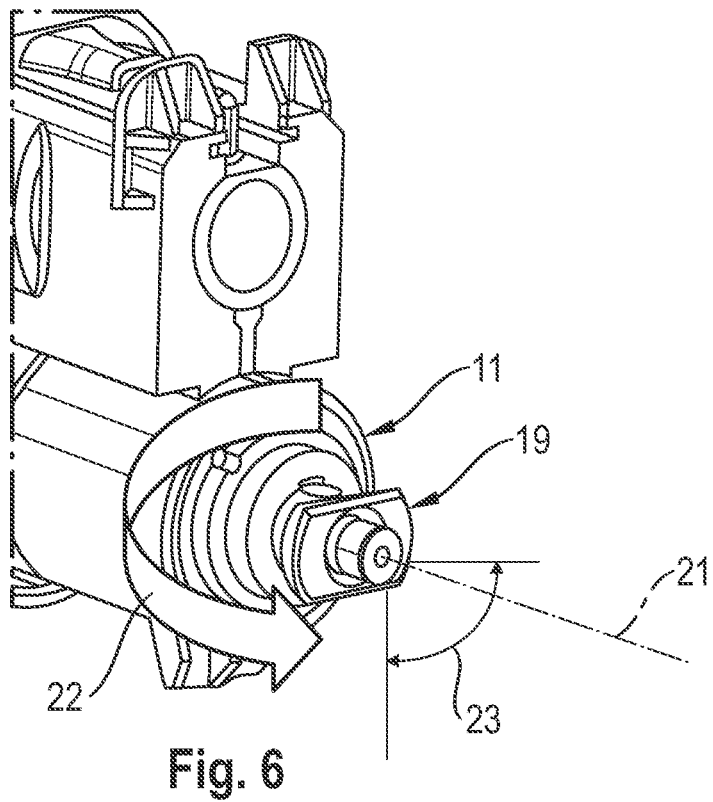
FIG. 6 shows an isometric view of the actuator.

In order that the charging plug opening 5 does not form a protruding contour during driving operation of the vehicle 1 and in order that the charging plug coupling 8 is protected from unauthorized access and otherwise from contamination when the vehicle 1 is at a standstill, the charging flap arrangement 3 has an adjustable charging flap 9 which serves to close the charging plug opening 5. Furthermore, the charging flap arrangement 3 is equipped with an electric locking device 10 which is shown in greater detail in FIGS. 4 to 6. The locking device 10 serves to lock the charging flap 9 which has been adjusted into a closed position in order to close the charging plug opening 5, and to this end has an electrically actuable actuator 11 which is shown in FIGS. 4 to 6. The actuator 11 can be adjusted between a locked state, in which the actuator 11 blocks the charging flap 9 in its closed position, and an unlocked state, in which the actuator 11 releases the charging flap 9 for opening and closing the charging plug opening 5. The locked state is portrayed in FIG. 4. The unlocked state is portrayed in FIG. 5.

In the case of the examples which are shown here, the charging flap 9 is mounted on the charging flap housing 6 such that it can be pivoted about a charging flap axis 12 between the closed position which closes the charging plug opening 5 and an open position which releases the charging plug opening 5. In the locked state of the actuator 11, the closed charging flap 9 cannot be opened. In the unlocked state of the actuator 11, the charging flap 9 can be opened and closed.

Moreover, the charging flap arrangement 3 is equipped with an emergency unlocking mechanism 13 which makes opening of the charging flap 9 possible even when the electric locking device 10 fails in the case of an actuator 11 which has been adjusted into the locked state. In the case of failure of the locking device 10, the actuator 11 can no longer be actuated electrically for adjusting from the locked state into the unlocked state. In order for it to be possible for this emergency unlocking mechanism 11 to be realized in an inexpensive and space-saving manner, the charging flap 9 here has a flap carrier 14, which is mounted pivotably on the charging flap housing 6, and a flap cover 15 which is fastened releasably to the flap carrier 14 on the outside. The flap cover 15 can be capable of being fixed releasably on the flap carrier 14 by means of suitable fastening elements 16, for example by means of elastic clip elements. The flap cover 15 can be separated from the flap carrier 14 by way of a suitable tool, without damage of the fastening means 16 (here, of the clip elements) occurring. Accordingly, the flap cover 15 can as it were be removed from the flap carrier 14 and attached again as often as desired. The flap carrier 14 is mounted on the charging flap housing 6 such that it can be pivoted about the flap axis 12. The locking action between the locking device 10 and the charging flap 9 takes place by way of the flap carrier 14, with the result that the flap cover 15 can be removed from the flap carrier 14 even in the case of a charging flap 9 which has been locked in the closed position. Accordingly, only the flap carrier 14 is blocked in the closed position by way of the actuator 11 which has been transferred into the locked state.

The flap carrier 14 according to FIGS. 1 to 3 can expediently have a support frame 39 and a flap covering 38. The support frame 39 is fastened to the flap covering 38 on the inside. The flap cover 15 is fastened releasably to this support frame 39. The mounting of the charging flap 9 on the flap housing 6 takes place via the flap carrier 14 and expediently via its flap covering 38 or via its support frame 39. In the views of FIGS. 2 and 3, the flap covering 38 conceals the charging plug coupling 8. The flap covering 38 can be equipped with a seal 40 which, in the closed position of the charging flap 9, surrounds the charging plug opening 5 and bears against the flap housing 6.

Moreover, the charging flap 9 is equipped with a fitting element 17 which has a locking contour 18 (shown in FIGS. 4 and 8) and is arranged on the flap carrier 14, preferably on the flap covering 39, such that it can be adjusted between an active position, which is portrayed in FIGS. 2 and 4, and a passive position, which is portrayed in FIGS. 3 and 5. According to FIGS. 4 and 8, the actuator 11 then has a latch 19 which can be adjusted between a locked position and an unlocked position. The locked position of the latch 19 is assigned to the locked state of the actuator 11, whereas the unlocked position of the latch 19 is assigned to the unlocked state of the actuator 11. According to FIG. 4, in its locked position, the latch 19 is in positively locking engagement with the locking contour 18 of the fitting element 17 which has been adjusted into its active position, in order thus to lock the charging flap 9 in its closed position. If in contrast, according to FIG. 5, the fitting element 17 is adjusted into its passive position, the locking contour 18 releases the latch 19 which has still been adjusted into its locked position. As a consequence, the charging flap 9 can be opened. According to FIGS. 2 and 3, the fitting element 17 is accessible in the case of a removed flap cover 15, with the result that it can be adjusted manually between the active position and the passive position. In the case of a flap cover 15 which is mounted on the flap carrier 14, such as on the support frame 39, the fitting element 17 is in contrast concealed according to FIG. 1 and is therefore inaccessible as soon as the charging flap 9 takes up its closed position. If the flap covering 38 which is mentioned further above is provided, the fitting element 17 is also inaccessible for a manual actuation in the open position of the charging flap 9.

The actuator 11 of the locking device 10 is expediently fastened to the charging flap housing 6. The fitting element 17 is expediently arranged in a flap region, remote from the flap axis 12, of the charging flap 9 on the flap carrier 14, such as on the flap covering 38.

According to FIG. 4, the latch 19 which has been adjusted into the locked position is in positively locking engagement in an opening direction 20 with the fitting element 17 which has been adjusted into the active position. In this opening direction 20, the fitting element 17 has to be moved out of the closed position in order to open the charging flap 9 or the flap carrier 14. As a result of the positively locking engagement between the latch 19 and the fitting element 17, this adjustment capability in the opening direction 20 is blocked. If, in contrast, the fitting element 17 is then adjusted into its passive position according to FIG. 5, it releases the positively locking engagement with the latch 19. As a consequence, the fitting element 17 can be adjusted out of the closed position in the opening direction 20 relative to the latch 19 in order to open the charging flap 9 or the flap carrier 14. In the case of the embodiments which are shown here, the opening direction 20 runs substantially perpendicularly with respect to the flap axis 12. In the case of the examples which are shown here, the opening direction 20 runs parallel to the latch axis 21 at the beginning of an opening movement of the charging flap 9.

In the case of the examples which are shown here, the latch 19 is arranged on the actuator 11 such that it can be adjusted rotationally about a latch axis 21, with the result that the latch 19 carries out a rotational movement 22 (indicated by way of an arrow in FIG. 6) by a locking angle 23 between the locked position and the unlocked position. The fitting element 17 is then for its part attached to the flap carrier 14, such as to the flap covering 38, such that it can be adjusted rotationally about a fitting axis 24, with the result that the fitting element 17 carries out a rotational movement by the locking angle 23 between the active position and the passive position. In the closed position, the latch axis 21 and the fitting axis 24 expediently coincide. By way of pivoting of the fitting element 17 by the locking angle 23 into the passive position, the positively locking engagement with the latch 19 is as it were canceled or deactivated. The locking angle 23 is expediently approximately 90°.

According to FIGS. 2, 3 and 8 to 11, the fitting element 17 expediently has an actuating arm 25 which is eccentric with regard to the fitting axis 24 and by way of which the fitting element 17 can be adjusted manually between the active position and the passive position. This actuating arm 25 is expediently arranged between the flap cover 15 and the flap covering 38, with the result that it is accessible for a manual actuation only in the case of a removed flap cover 15.

According to FIGS. 2 and 3, the support frame 39 of the flap carrier 14 defines a carrier opening 26 which is concealed from the outside by the flap cover 15 in the case of the flap cover 15 being attached to the flap carrier 14. In the case of a removed flap cover 15, the actuating arm 25 is accessible for the manual actuation thereof through the carrier opening 26. From the inside, the carrier opening 26 is covered by way of the flap covering 38. Accordingly, the removal of the flap cover 15 does not permit any access to the charging plug coupling 8 as long as the flap carrier 14 still assumes its closed position.

In the examples of FIGS. 7 and 9 to 11, the flap carrier 14 or the flap covering 38 is shown only in the region of a circular disk.

Figure 7:
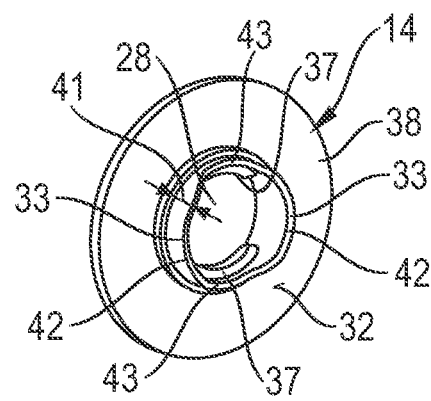
FIG. 7 shows an isometric view of a flap carrier outer side in the region of a fitting opening.
Figure 8:
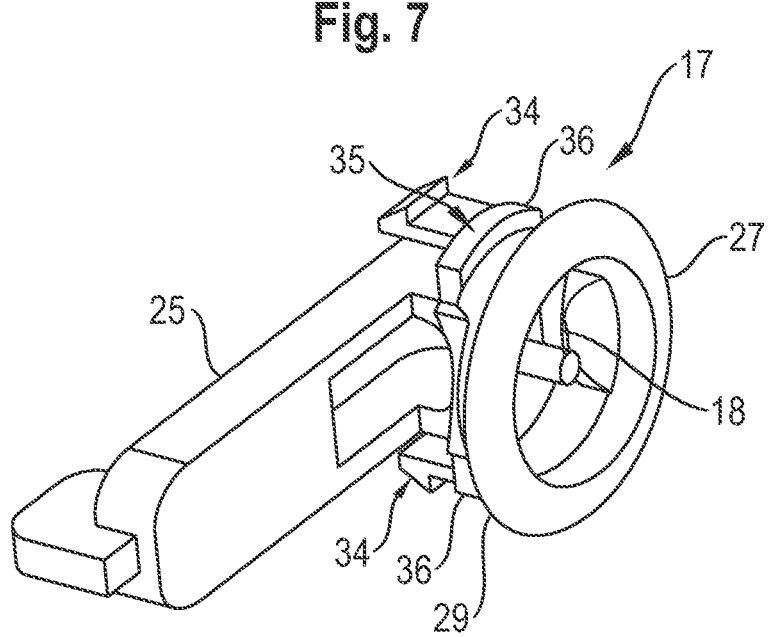
FIG. 8 shows an isometric view of the fitting element.
Figure 9:
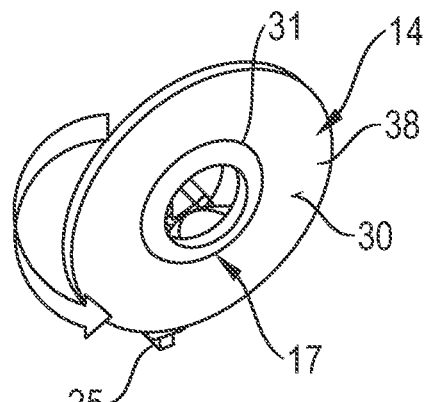
FIG. 9 shows an isometric view of a flap carrier inner side in the region of the fitting opening in the case of an inserted fitting element.
Figure 10:
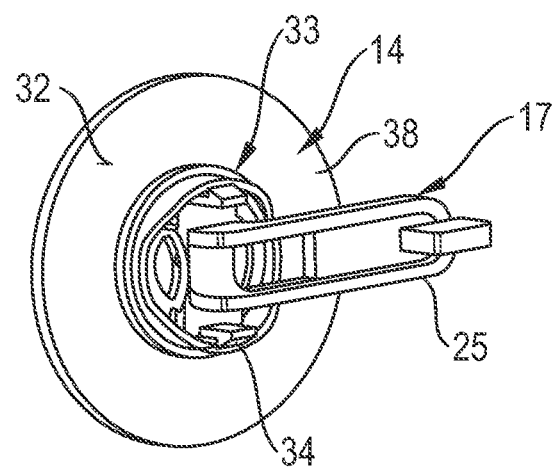
FIG. 10 shows an isometric view of the flap carrier outer side in the case of a fitting element inserted into the fitting opening in the passive position.
Figure 11:
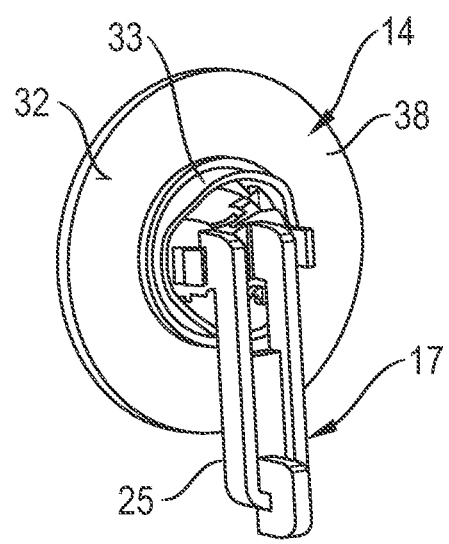
FIG. 11 shows a view as in FIG. 10, but with a fitting element which has been adjusted into its active position.

According to FIGS. 8 to 11, the fitting element 17 can have an annular body 27 which has the locking contour 18 and, according to FIGS. 9 to 11, is inserted into a fitting opening 28 which is configured on the flap carrier 14, such as on the flap covering 38. The fitting opening 28 can be seen in FIG. 7 in the case of the absence of a fitting element 17. The annular body 27 has the locking contour 18 radially on the inside, whereas it has an annular step 29 radially on the outside. The annular step 29 is supported, on a flap inner side 30, facing the actuator 11, of the flap carrier 14, such as of the flap covering 38, on an opening edge 31 which surrounds the fitting opening 28. With the annular step 29, the annular body 27 forms an axial pivot bearing for the fitting element 17 on the flap carrier 14, such as on the flap covering 38.

According to FIGS. 7, 10 and 11, the flap carrier 14, and in some embodiments, the flap covering 38, has, on a flap outer side 32 which faces away from the actuator 11, a retaining guide piece 33 which surrounds the fitting opening 28. This retaining guide piece 33 projects axially on the flap inner side 32, that is to say parallel to the fitting axis 24, and, according to FIG. 7, has an axial height 41 which varies in the circumferential direction. As a result, the retaining guide piece 33 has two long sections 42 and two short sections 43 which follow one another in the circumferential direction and merge into one another.

According to FIGS. 8, 10 and 11, the fitting element 17 has at least two catches 34 which hold the fitting element 17 on the retaining guide piece 33 in the passive position, which is shown in FIG. 10. Accordingly, the catches 34 are in engagement with the long sections 42 of the retaining guide piece 33.

Furthermore, a bayonet fastening 35 can be configured between the actuating element 17 and the flap carrier 14, in order to fix the fitting element 17 on the flap carrier 14. The bayonet fastening 35 has two projections 36 on the annular body 27 which lie diametrically opposite one another and radially project axially between the annular step 29 and the catches 34, and two projections 37 which are complementary with respect thereto and project radially to the inside on the retaining guide piece 33. In the active state according to FIG. 11, the projections 36 of the fitting element 17 and the projections 37 of the flap carrier 14 are in positively locking engagement with one another. The bayonet fastening 35 is then closed and secures the fitting element 17 on the retaining guide piece 33 in the active position.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A charging flap arrangement for closing a charging plug opening which is provided in a vehicle body part of a motor vehicle, the charging flap arrangement comprising:
   a charging flap housing which configures a recess for arranging a charging plug coupling, the recess configuring the charging plug opening opposite the charging plug coupling, through which charging plug opening a charging plug which is complementary to the charging plug coupling can be plugged to the charging plug coupling;
   an adjustable charging flap for closing the charging plug opening;

an electric locking device for locking the charging flap in a closed position thereof that closes the charging plug opening, and wherein the locking device has an electrically actuable actuator which can be adjusted between a locked state, in which the actuator blocks the charging flap in its closed position, and an unlocked state, in which the actuator releases the charging flap for opening and closing the charging plug opening; and an emergency unlocking mechanism which makes opening of the charging flap possible if the electric locking device fails in the case of the actuator having been adjusted into the locked state, wherein the charging flap has a flap carrier, which is mounted pivotably on the charging flap housing, and a flap cover, which is fastened releasably to the flap carrier, wherein:

the charging flap has a fitting element which has a locking contour and which is arranged on the flap carrier such that it can be adjusted between an active position and a passive position, the actuator has a latch which can be adjusted between a locked position, which the latch assumes in the locked state of the actuator, and an unlocked position, which the latch assumes in the unlocked state of the actuator, in its locked position, the latch is in engagement with the locking contour of the fitting element which has been adjusted into its active position, in order to lock the charging flap in its closed position, in the passive position of the fitting element, the locking contour releases the latch which has been adjusted into its locked position, such that the charging flap can be opened, and the fitting element is accessible for a manual adjustment of the fitting element between the active position and the passive position when the flap cover is removed.

2. The charging flap arrangement as claimed in claim 1, wherein the latch is arranged on the actuator such that it can be adjusted rotationally about a latch axis, and performs a rotational movement by a locking angle between the locked position and the unlocked position, and wherein the fitting element is arranged on the flap carrier such that it can be adjusted rotationally about a fitting axis, and performs a rotational movement by the locking angle between the active position and the passive position.

3. The charging flap arrangement as claimed in claim 2, wherein the fitting element has an actuating arm which is eccentric with regard to the fitting axis and by way of which the fitting element can be adjusted manually between the active position and the passive position.

4. The charging flap arrangement as claimed in claim 1, wherein the charging flap is mounted on the charging flap housing such that it can be pivoted about a charging flap axis between the closed position which closes the charging plug opening and an open position which releases the charging plug opening, and wherein the fitting element is arranged in a flap region of the charging flap, the flap region being arranged remotely from the flap axis.

5. The charging flap arrangement as claimed in claim 4, wherein the latch, when adjusted into the locked position, is in positively locking engagement in an opening direction with the fitting element when the fitting element has been adjusted into the active position, in which opening direction the fitting element has to be moved out of the closed position in order to open the charging flap, and wherein the fitting element releases the positively locking engagement in its passive position, such that the fitting element can be adjusted out of the closed position in the opening direction relative to the latch in order to open the charging flap.

6. The charging flap arrangement as claimed in claim 1, wherein the fitting element has an annular body which has the locking contour, and wherein the fitting element is inserted into a fitting opening which is configured on the flap carrier, and has the locking contour on the inner side and an annular step on the outer side, which annular step is supported, on a flap inner side of the flap carrier which faces the actuator, on an opening edge which surrounds the fitting opening.

7. The charging flap arrangement as claimed in claim 6, wherein, on a flap outer side which faces away from the actuator, the flap carrier has a retaining guide piece which surrounds the fitting opening and projects parallel to the fitting axis.

8. The charging flap arrangement as claimed in claim 7, wherein the fitting element has at least two catches which retain the fitting element on the retaining guide piece in the passive position.

9. The charging flap arrangement as claimed in claim 7, wherein a bayonet fastening is configured between the retaining guide piece and the fitting element, the bayonet fastening being configured to hold the fitting element on the retaining guide piece in the active position.

10. The charging flap arrangement as claimed in claim 1, wherein:

the flap carrier has a support frame, the support frame having an outside and an inside, the flap cover is fixed releasably on the outside and a flap covering is fastened to the support frame on the inside, and the fitting element is arranged adjustably on the flap covering.

11. A vehicle with a vehicle body and with at least one charging flap arrangement as claimed in claim 1.

* * * * *